United States Patent [19]

Graham et al.

[11] 4,249,284
[45] Feb. 10, 1981

[54] POULTRY GIZZARD PROCESSING SYSTEM

[76] Inventors: Kenneth Z. Graham, Rte. 2, Dawsonville, Ga. 30534; Johnny R. Graham, Rte. 8, Gainesville, Ga. 30501

[21] Appl. No.: 17,155

[22] Filed: Mar. 5, 1979

[51] Int. Cl.³ ............................................. A22C 21/00
[52] U.S. Cl. ............................................. 17/52; 17/11
[58] Field of Search .................. 17/11, 53, 52, 73, 45, 17/50

[56] References Cited

U.S. PATENT DOCUMENTS

| | | | |
|---|---|---|---|
| 2,245,329 | 6/1941 | Danielsson | 17/52 |
| 2,787,806 | 4/1957 | Jett et al. | 17/11 |
| 3,187,376 | 6/1965 | Laws | 17/52 X |
| 3,704,484 | 5/1972 | Lapeyre et al. | 17/73 |
| 3,952,371 | 4/1976 | La Pine et al. | 17/52 |
| 3,990,128 | 11/1976 | van Mil | 17/11 X |
| 4,073,040 | 2/1978 | Hill | 17/11 X |
| 4,074,390 | 2/1978 | Meyn | 17/11 |
| 4,183,117 | 1/1980 | Meyn | 17/11 |
| 4,203,178 | 5/1980 | Hazenbroek | 17/50 X |

*Primary Examiner*—Willie G. Abercrombie
*Attorney, Agent, or Firm*—Jones, Thomas & Askew

[57] ABSTRACT

Poultry gizzards with entrails such as gut and stomach attached are supported at first on a rotary drum with a helical tread and a rotary support bar whereupon the gizzards are urged along a path and are oriented so that the entrails hang therebelow as they move along the path. As the gizzards move beyond the rotary drum they move onto a stationary support bar that also cooperates with an extension of the rotary support bar, and a conveyor moves down into engagement with the gizzards and urges the gizzards further along the path. A rotary cutting disc extending over the support bars severs the entrails from the gizzards, and a second rotary cutting disc protrudes upwardly between the support bars and splits the gizzards. The split gizzards then straddle a support rail and move up on and over helical cleaning wheels which further separates the cut-apart portions of the gizzards to permit water spray to remove the particles from the gizzards. The gizzards are discharged to a peeling mechanism where the outer cover of the gizzards is pulled off.

15 Claims, 11 Drawing Figures

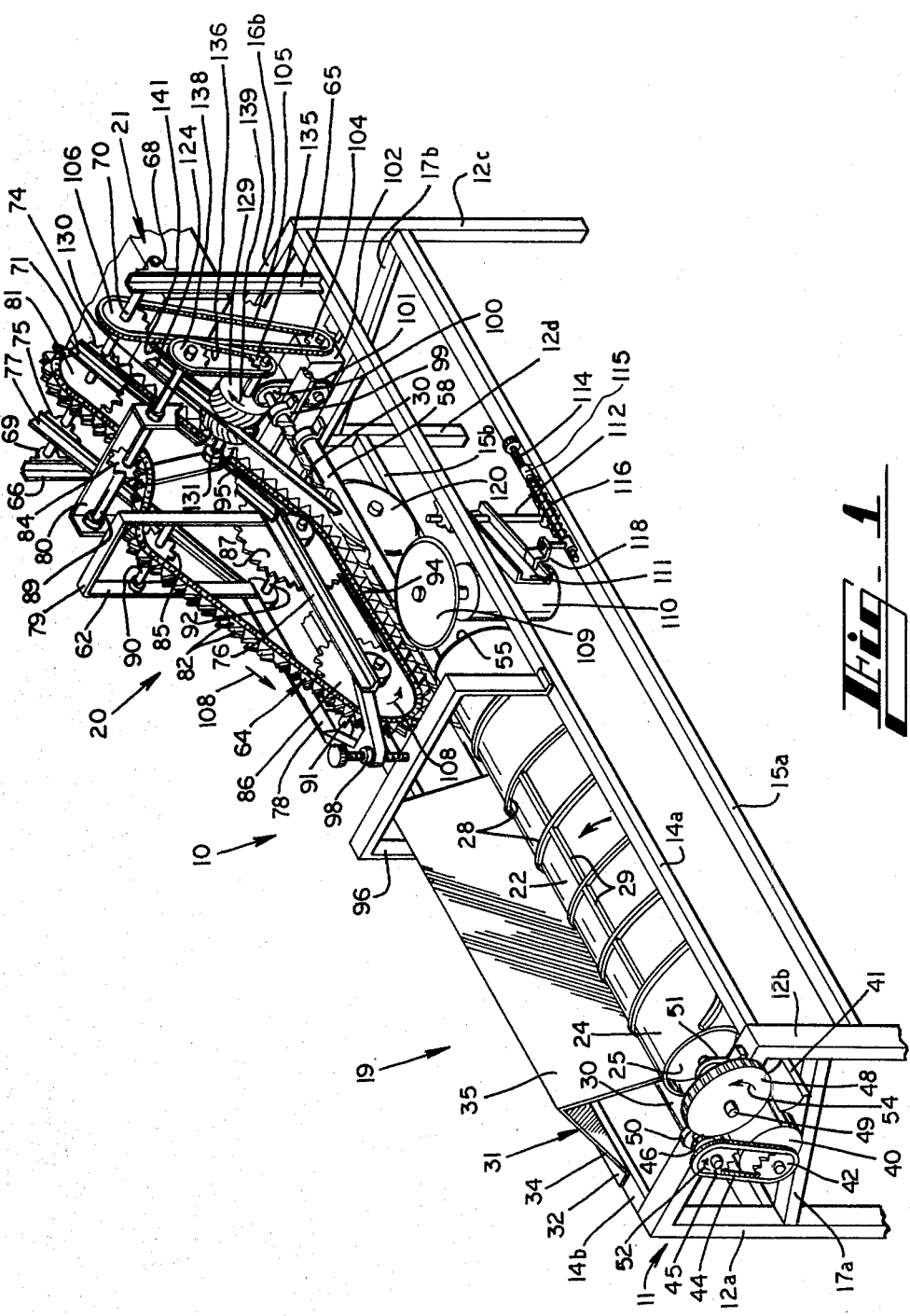

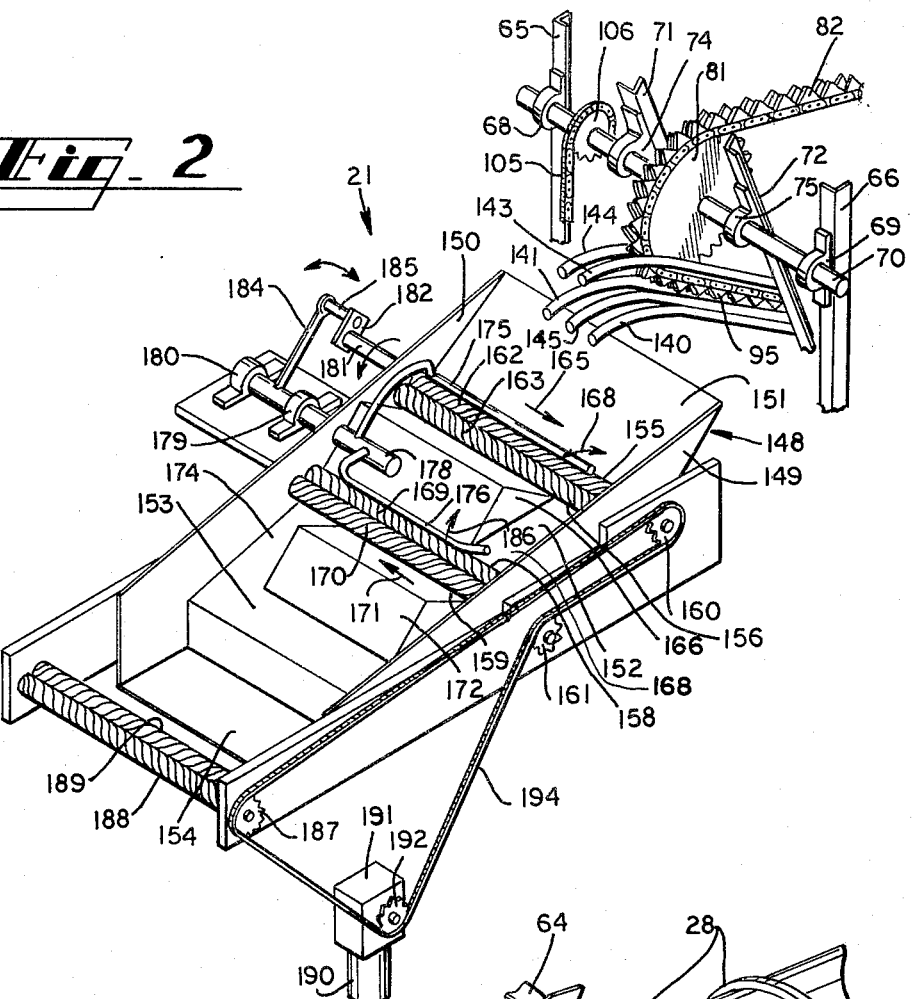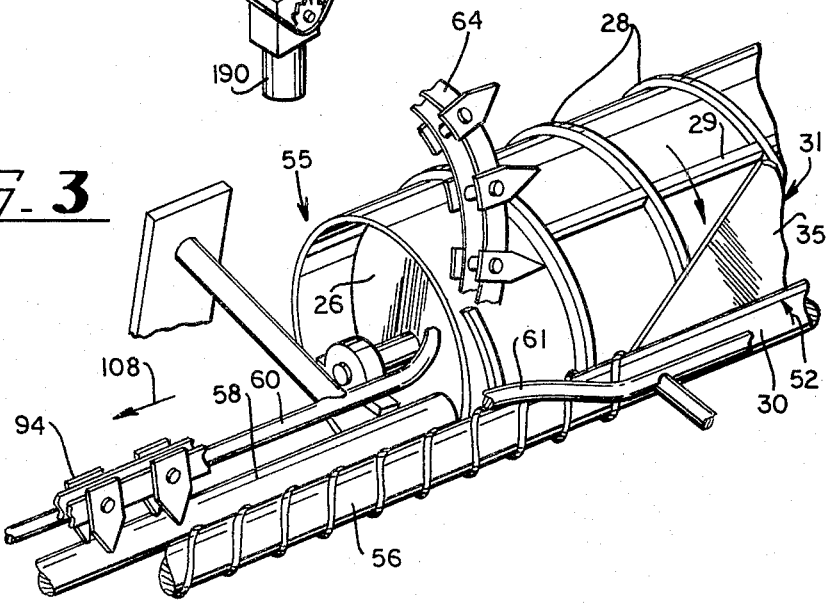

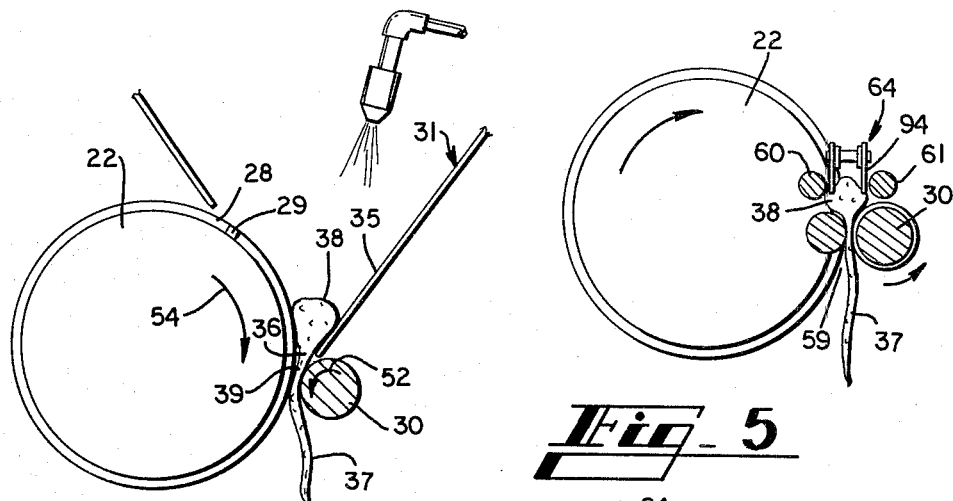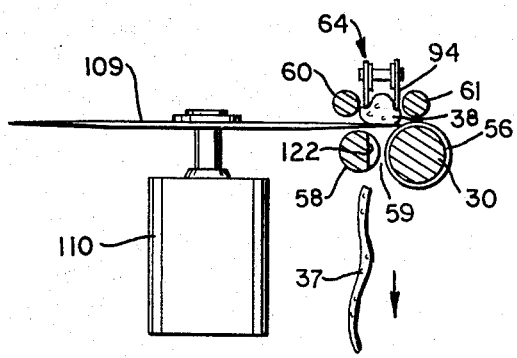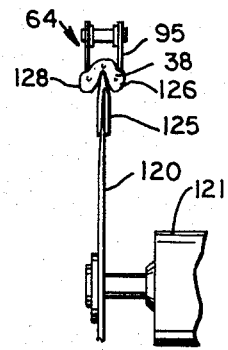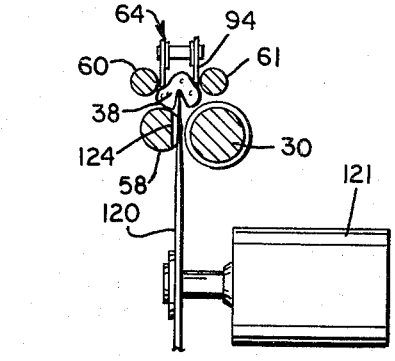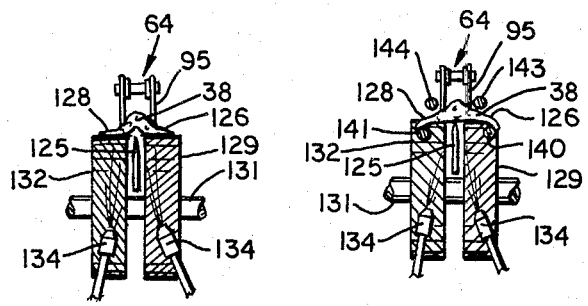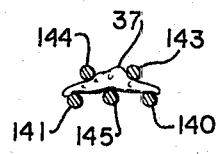

POULTRY GIZZARD PROCESSING SYSTEM

DESCRIPTION

BACKGROUND OF THE INVENTION

This invention relates to improvements in poultry processing methods and equipment of the type which cut open or "split" gizzards and remove the outer covering or "skin" from the gizzards. Poultry gizzards that have been extracted from chickens or other poultry with gut and stomach still attached thereto usually are moved through a processing path, and while moving through the path the gut and stomach are removed from the gizzards and the gizzards are split and loose material removed therefrom, and the gizzards are subsequently peeled.

In the past, gizzards have been removed from poultry and processed separately, as by removing the gut and stomach from the gizzards by hand, cutting the gizzards, and urging the outer skin or peeling of the gizzards into spiral peeler rolls so as to strip the outer covering from the gizzards. Some of the prior art documents that disclose gizzard processing equipment are U.S. Pat. Nos. 3,159,872, 3,406,425, 3,411,828, 4,057,875 and 4,073,040 of C. J. Hill and 4,074,390 of P. Meyn. The various equipment that has been used in the past takes advantage of the size and density of the gizzard in comparison to the gut and stomach attached thereto, by supporting the gizzard and allowing the entrails to be suspended therefrom, and then moving the supported gizzard through the various processing steps where the entrails are removed, the gizzards split, cleaned and peeled.

While the prior gizzard processing equipment has been successful to some extent, the gizzards are not always oriented correctly as they move through the equipment, resulting in the entrails not being properly cut from the gizzards and the gizzards not being split at the proper location on the gizzards. Also, the differences in size, shape and texture of gizzards being processed by the prior art equipment appear to cause malfunctions in the equipment, resulting in improperly processed gizzards.

SUMMARY OF THE INVENTION

Briefly described, the present invention comprises a method and apparatus for processing poultry gizzards wherein the gizzards are moved in sequence along a processing path, and as they move along the path, the gizzards are oriented with the portions thereof to which the entrails are attached facing downwardly with the entrails suspended therebelow, and the connection between the entrails and the gizzards are cut and the entrails fall away from the gizzards. The gizzards are carried without reorienting the gizzards to a subsequent cutting station where the gizzards are split in the area thereof to which the entrails were attached, and the cut-apart portions of the gizzards are then spread further apart and a water spray is used to wash the loose matter from the gizzards. The gizzards are then moved to a peeler where they are automatically urged into successive contact with pairs of peeler rolls so that the outer covering or "skin" is peeled from the gizzards.

A rotary drum with a spiral tread is located adjacent a parallel rotary support bar, and the gizzards are first placed on the drum and support bar. The rotation of the drum and its spiral tread tend to urge the gizzards in sequence along the processing path and the smaller, less dense entrails tend to pass through the slot between the rotary drum and rotary support bar. The weight of the entrails and the motion of the rotary drum and the rotary support bar tend to orient the gizzards so that the portions thereof to which the entrails are attached become oriented downwardly. When the gizzards reach the end of the rotary drum, the gizzards pass from the rotary drum support onto a stationary support bar, and the rotary support bar extends beyond the rotary drum on parallel to the stationary support bar to continue to support the gizzards and forms a continuation of the slot through which the entrails are suspended. A chain conveyor has its lower flight movable into contact with the gizzards supported on the support bars to continue the movement of the gizzards without reorientation thereof along the processing path, whereupon a horizontal disc cutter extending over the support bars severs the entrails from the lower portions of the gizzards, and a vertical cutting disc protruding upwardly between the support bars cuts into and splits the gizzards. The gizzards then move from the vertical cutting disc onto a support rail where the cut-apart portions straddle the support rail, and the cut-apart portions then move over a pair of cleaning wheels which also straddle the support rail. The cleaning wheels rotate with a tangential velocity which is greater than the linear velocity of the gizzards and include spiral treads which tend to urge the cut-apart portions of the gizzards away from each other, and water jets directed into the gizzards tend to wash the loose particles from the gizzards. The gizzards are then moved to the peeling mechanism where the skin is removed from the gizzards.

Thus, it is an object of the present invention to provide a method and apparatus which expediently and reliably removes entrails from poultry gizzards, splits the gizzards at the area thereof to which the entrails were attached, removes the loose particles from within the gizzards and peels the gizzards.

Another object of this invention is to provide a reliable and rapidly operating apparatus for processing poultry gizzards.

Another object of this invention is to provide a method for properly orienting poultry gizzards and then maintaining the proper orientation of the poultry gizzards in a gizzard processing system so that the entrails attached to the gizzards can be removed and the gizzards can be properly split and cleaned.

Other objects, features and advantages of the present invention will become apparent upon reading the following specification, when taken in conjunction with the accompanying drawings.

BRIEF DESCRIPTION OF THE DRAWINGS

FIG. 1 is a perspective illustration of the gizzard processing apparatus, with parts removed therefrom for clarity.

FIG. 2 is a perspective view of a portion of the poultry processing apparatus, showing the peeler mechanism.

FIG. 3 is a detail perspective illustration of portions of the rotary drum, rotary support bar, stationary support bar and the chain conveyor.

FIGS. 4, 5, 6, 7, 8, 9, 10 and 11 are progressive schematic illustrations of the gizzard processing equipment and the manner in which the gizzards are processed.

DETAILED DESCRIPTION

Referring now in more detail to the drawings, in which like numerals indicate like parts throughout the several views, FIG. 1 illustrates the poultry gizzard processing apparatus 10 which includes a support framework 11 comprising upright support legs 12a, 12b, 12c and 12d and horizontally extending side beams 14a and 14b, lower side beams 15a and 15b, end braces 16a, 16b and lower end braces 17a and 17b. The poultry gizzard processing apparatus 10 includes an infeed section 19, a processing section 20 and a peeling section 21. The infeed section 19 includes a rotary drum 22 which includes a cylindrical outer surface 24, recessed end walls 25, 26 (FIG. 3), and a spiral thread 28 is imposed on the cylindrical surface. A series of longitudinally extending ribs 29 of the same size and shape as the spiral thread extend between the spiral thread sections, so that the tread of the rotary drum comprises a continuous spiral thread with the joining ribs. A rectilinear rotary support bar 30 is positioned in side-by-side, parallel relationship with respect to rotary drum 22, and extends substantially the entire length of the processing apparatus 10. Infeed tray 31 is mounted on framework 11 and includes support flange 32, upwardly inclined section 34, and downwardly inclined feed section 35 which has a lower edge 36 (FIG. 4) positioned over rotary support bar 30 at such a position so as to guide poultry gizzards 38 toward the slot 39 between support bar 30 and rotary drum 22.

Electric motor 40 is mounted on support plate 41 which is hingedly mounted at one of its ends to framework 11, and its sprocket 42 drives driving chain 44 and sprocket 45. Sprocket 45 is connected to the end of rectilinear rotary support bar 30, and driving gear 46 is mounted to rotary support bar 30 and meshes with the driven gear 48 on the axle 49 of rotary drum 22. Support bar 30 and the axle 49 of rotary drum 22 are both mounted on suitable bearings at their opposite ends, such as bearing 50 of support bar 30 and bearing 51 of rotary drum 22. When motor 40 is energized, rotary support bar 30 will be driven in the direction indicated by arrow 52 while rotary drum 22 will be driven in the opposite direction indicated by arrow 54. Thus, when a poultry gizzard 38 is dropped in the area between the downwardly inclined feed section 35 of infeed tray 31 and rotary drum 22 (FIG. 4), the gizzards will be supported by the rotary drum 22 and support bar 30 and the stomach, gut and other entrails 37 will tend to move through the slot 39 between the rotary drum 22 and support bar 30, and be suspended beneath the larger, more dense gizzard 38. When the longitudinal ribs 29 of the tread of the rotary drum pass downwardly adjacent the gizzards 38, the gizzards 38 tend to be vibrated or bounced in their positions on infeed tray 31 and the suspended entrails pulled downwardly, causing the gizzards to be oriented so that the portions thereof to which the entrails are connected are located beneath the gizzards and the entrails are suspended directly therebelow. Also, the rotation of both the rotary drum and rotary support bar in downward directions tends to keep the gizzards from rolling as they are moved along the processing path. Thus, by the time the spiral thread 28 urges each gizzard to the delivery end 55 of the rotary drum 22, the gizzards will be oriented properly for transfer to processing section 20.

The rectilinear support bar 30 extends on beyond the delivery end 55 of drum 22, and the surface of the portion thereof which extends beyond the rotary drum has a spiral thread 56 imposed thereon. Thus, the gizzards reaching the delivery end 55 of rotary drum 22 will continue their movement through the gizzard processing apparatus. A stationary support bar 58 is located in side-by-side, parallel relationship with respect to rectilinear support bar 30 and forms a slot 59 which is a continuation of slot 39. Additional upper stationary guide bars 60 and 61 are located over and parallel to rectilinear support bar 30 and stationary support bar 58. These elements extend from the delivery end 55 of end feed section 19 and extend on through processing section 20.

Upper framework 62 is mounted over framework 11 and supports conveyor chain assembly 64 in processing section 20. Stationary upright support stanchions 65 and 66 are mounted on framework 11, and bearings 68 and 69 which are mounted thereto at their upper ends rotatably support main axle 70. Upper framework 62 includes inclined support rails 71 and 72 which are mounted with their bearings 74 and 75 on main axle 70. Horizontal support rails 76 and 78 are attached to the lower ends of inclined support rails 71 and 72 and upright frames 79 and 80 are mounted to horizontal support rails 76 and 78 and to inclined support rails 71 and 72. Drive sprocket 81 is keyed to main axle 70 and conveyor chain 82 is driven by drive sprocket 81 about driven sprockets 84, 85, 86 and 87. Driven sprocket 84 is mounted on axle 89 which is supported by upright frame 80, driven sprocket 85 is mounted on axle 90 which is mounted at its ends on upright frame 79, driven sprocket 86 is mounted on axle 91 which is supported by its bearings on horizontal support rails 76 and 78, and driven sprocket 87 is mounted on its axle 92 which is held by its bearings on horizontal support rails 76 and 78. Thus, conveyor chain 82 forms a horizontal lower flight 94 between driven sprockets 86 and 87 and an inclined lower flight 95 between driven sprocket 87 and drive sprocket 81.

It will be noted that one end of the entire conveyor chain assembly 64 is supported by main axle 70, while the other end is supported on the inverted U-shaped frame section 96 of framework 11, by the adjustable crew 98 extending through the end of the horizontal support rails 76 and 78 and bearing against inverted U-shaped frame section 96. With this arrangement the height of the horizontal lower flight 94 and inclined lower flight 95 of the conveyor chain assembly 64 can be adjusted by turning the screw 98.

The distal end of rectilinear support bar 30 which is remote from its driving motor 40 is mounted in bearing 99, and a sprocket 100 is mounted on its end for driving chain 101. Chain 101 extends to gear box 102, and the output sprocket 104 of gear box drive driving chain 105. Driving chain 105 is connected by means of its upper sprocket 106 to main axle 70. Thus, motor 40 drives both rectilinear support bar 30 as well as conveyor chain assembly 64, and the direction of movement of the conveyor chain assembly is indicated arrows 108.

Horizontal cutting disc 109 (FIGS. 1 and 6) is located at the entrance to processing section 20 and extends across stationary support bar 58 and rectilinear support bar 30, beneath guide bars 60 and 61. Disc 109 is connected to and rotatable with the drive shaft of motor 110, and motor 110 is mounted to pivotal support 111. Vertical support axle 112 is mounted to framework 11 and the pivotal support 111 is mounted thereon and pivots thereabout. Slide rod 114 extends through slide block 115 and is connected to pivotal support 111 by means of bracket 118. Coil compression spring 116 abuts slide block 115 and urges the pivotal support 111, motor 110 and horizontal cutting disc 109 toward stationary support bar 58 and rectilinear support bar 30 so as to be in position to properly cut away the entrails 37 of the gizzards 38; however, if a hard obstruction passes through the system, the horizontal cutting disc 109 can move against the bias of spring 116 to move away from the processing path.

Vertical cutting disc 120 (FIGS. 1 and 7) is positioned along the processing path and is mounted on the rotary drive shaft of motor 121. Motor 121 is mounted in a manner similar to the mounting of motor 110, so that the motor and its vertical cutting disc 120 are biased toward but can be moved away from the processing path. Vertical cutting disc 120 extends upwardly between stationary support bar 58 and rectilinear rotary support bar 30, to cut upwardly into the gizzards 38 as the gizzards are moved along the processing path. As illustrated in FIGS. 6 and 7, recesses 122 and 124 are formed in stationary support bar 58 in the vicinity of cutting discs 109 and 120. The recess 122 is beneath horizontal cutting disc 109 and functions to enlarge the area of slot 59 beneath the cutting disc, so that the entrails cut by cutting disc 109 are free to fall from the gizzards 38. Thus, slot 59 is temporarily enlarged beneath the cutting disc 109, and when the gizzards 38 pass over the cutting discs 109, the gizzards will be placed back on the rectilinear support bar 30 and stationary support bar 58 where the dimensions of slot 59 were the same as they were prior to the gizzards passing up onto the cutting disc 109.

With respect to the recess 124 of the stationary support bar 58, the vertical cutting disc 120 extends up through the enlarged slot area.

Support rail 125 is inclined upwardly from the upper edge surface of vertical cutting disc 120 and extends substantially parallel to the inclined lower flight 95 of conveyor chain assembly 64. Support rail 125 is bifurcated and its lower end portions are mounted about vertical cutting disc 120 (FIG. 8). When the vertical cutting disc 120 cuts into or "splits" a gizzard 38, the cut apart portions 126 and 128 move on opposite sides of support rail 124, so that the gizzard is mounted on and straddles the support rail and tends to follow the support rail as it is moved by the conveyor chain assembly 64 on through the processing section 20.

A pair of cleaning wheels 129 and 130 also straddle support rail 125 and are mounted on a common axle 131 which extends perpendicular to support rail 125 and the path of movement of the gizzards. The surfaces or treads of the cleaning wheels 129 and 130 are formed with spiral threads 132, and the threads are angled so that the portions of the threads adjacent the support rail 125 lead those portions positioned away from the support rail. When the gizzards 38 are moved along rail 125 so that the gizzards engage the cleaning wheels 129 and 130, the cut apart portions 126 and 128 of the gizzards tend to ride up onto and over the cleaning wheels 129 and 130, and the surface velocity of the cleaning wheels 129 and 130 is greater than the linear velocity of the gizzards 38, so that the spiral threads 132 of the cleaning wheels tend to urge the cut apart portions 125 and 126 of the gizzards further apart, to spread the gizzards open. Water nozzles 134 are directed upwardly so as to direct a flow of water into the cut apart and spread apart portions 125 and 126 of the gizzards 38 to remove the loose matter from inside the gizzards. The axle 131 of cleaning wheels 129 and 130 is suspended from the inclined support rails 71 and 72, and driven sprocket 135 is connected by driving chain 136 to driving sprocket 138, and driving sprocket 138 is mounted on the end of axle 89 of idler sprocket 84. Thus, the movement of conveyor chain assembly 64 causes the cleaning wheels 129 and 130 to rotate in the direction as indicated by arrow 139.

Lower guide rods 140 and 141 extend from the surfaces of cleaning wheels 129 and 130 on up the incline of guide rail 125 and tend to maintain the spread apart portions 126 and 128 of the gizzards 37 spread as the additional water nozzles 134 spray streams of water into the opened portions of the gizzards. Upper guide rods 143 and 144 also extend parallel to the processing path but are located above the path of gizzards 37. When the conveyor chain begins to move around drive sprocket 81, the gizzards are pulled from the teeth of the conveyor chain by the upper guide rods 143 and 144 and the momentum of the gizzards along the processing path carries the gizzards (FIG. 11) off the ends of the guide rods. An additional center guide rod 145 extends from the upper edge of guide rail 124 (FIG. 2) so as to guide the center portion of the cut gizzards toward the peeling section 21.

As illustrated in FIG. 2, peeling section 21 comprises a tray 148 which includes side walls 149 and 150 and inclined bottom wall sections 151, 152, 153 and 154. A first pair of spiral threaded peeler rolls 155 and 156 are located in the upper portion of tray 148 and a second pair of peeler rolls 158 and 159 are located at a lower position in tray 148. Each pair of peeler rolls 155, 156 and 158, 159 are driven by end sprockets 160, 161, and the spiral threads on each pair of peeler rolls engage each other so as to cause the peeler rolls to rotate in opposite directions of rotation, with the upper surfaces of the peeler rolls rotating downwardly in between the pairs of peeler rolls. The spiral threads 162 and 163 of the upper pair of peeler rolls 155 and 156 are angled so that those gizzards received on the peeler rolls 155 and 156 are urged by the threads in the direction indicated by arrow 165. An upwardly extending protrusion or dam 166 is located on one side of tray 148, and the dam together with the bottom wall section 151 guides the gizzards downwardly toward the peeler rolls 155 and 156. The slot 168 between dam 166 and side wall 149 forms a passage for the gizzards between first pair of peeler rolls 155 and 156 to the second pair of peeler rolls 158 and 159.

A second pair of peeler rolls 158 and 159 have their spiral threads 169 and 170 angled in the opposite direction from the spiral threads 162 and 163 of the peeler rolls, so as to urge the gizzards to move in the direction indicated by arrow 171. The lower dam 172 together with the bottom wall section 152 tend to guide the gizzards onto the upper surfaces of peeler rolls 158 and 159, and the passage 174 at the end of dam 172 permits the gizzards to move down bottom wall section 153 after the gizzards have passed over the peeler rolls 169 and 170.

The oscillating presser bars 175 and 176 each are positioned over one of the pairs of peeler rolls 155, 156 or 158, 159. The presser bars 175 and 176 are both rigidly connected to shaft 178, and shaft 178 is mounted in bearings 179 and 180. One of the peeler rolls 155, 156 has an extension 181, and cam 182 protrudes at a right angle from extension 181. Crank 184 is rigidly connected at one end to shaft 178 and its other end is pivotally connected to crank link 185. Crank link 185 is also pivotally connected to cam 182. Thus, the rotation of the peeler rolls 155 and 156 causes presser bars 175 and 176 to oscillate as indicated by arrows 186, causing any gizzards present on the peeler rolls 155, 156, or 158, 159 to be alternately pressed into the threads of the peeler rolls, causing the threads to more firmly grip the peeling of the gizzards, thereby removing the peeling from the gizzards.

After the gizzards have passed over the pairs of peeler rolls, they move down to the lower horizontal bottom wall section 154 of the tray 148, where they can be inspected by a worker. A third pair of peeler rolls 188 and 189 are located adjacent bottom wall section 154, and the worker can place a gizzard located in bottom wall section 154 against the teeth of the peeler rolls 188, 189 to remove any peeling or skin remaining on the gizzards.

Drive motor 190 is connected to gear box 191, and the output sprocket 192 of gear box 191 drives the continuous drive chain 194. Drive chain 194 extends about the sprockets 160, 161 and 187 of the pairs of peeler rolls, thereby driving all the peeler rolls from one power source.

OPERATION

When the poultry gizzard processing apparatus 10 is placed in operation, gizzards with entrails attached thereto are dropped between the downwardly inclined section 35 of the infeed tray 31 and the rotary drum 22. The gizzards then become supported by the rotary drum 22 and by the rectilinear rotary support bar 30, and partially by the lower edge portion 36 of the infeed tray 31. The rotation of rotary drum 22 together with the spiral configuration of the threads 28 on the rotary drum tend to urge the gizzards along the length of the infeed section 19, and the gizzards become oriented so that their attached entrails 37 tend to hang therebeneath downwardly through the slot 39 formed between the rotary drum 22 and the rectilinear support bar 30, with the portion of the gizzards to which the entrails are connected becoming oriented downwardly.

When the gizzards reach the end of rotary drum 22, they move onto the spiral threaded portion of the rectilinear rotary support bar 30 and onto the stationary support bar 38. The rotation of the rectilinear support bar 30 causes its threads to tend to carry the gizzards on through the processing section 20, and the conveyor chain moves down into engagement with the gizzards (FIGS. 3 and 5) so that the combined movement of the conveyor chain together with the rotation of the spiral threaded rectilinear support bar 30 causes the gizzards to move from the rotary drum without reorientation.

When the gizzards reach the horizontal cutting disc 109, the disc cuts beneath the gizzards 38 so that the entrails 37 which are attached thereto are cut away from the gizzards. The enlarged recessed portion 122 beneath the cutting disc 109 assures that the entrails will be free to fall downwardly away from the gizzards.

After the gizzards have passed over the cutting disc 109, they continue to be moved by the lower horizontal flight 94 of the conveyor chain and the spiral threads of the rectilinear support bar 30 toward vertical cutting disc 120. The vertical cutting disc 120 (FIG. 7) extends upwardly between stationary support bar 58 and rectilinear support bar 30 in the vicinity of recess 124 so as to cut upwardly into the gizzards 38 to "split" the gizzards. The lower flight 94 of the conveyor chain continues to grasp each gizzard and hold the gizzards as they are being cut.

After the gizzards have been cut they move from the vertical cutting disc 120 onto support rail 125 and begin to move up the inclined portion of the processing path (FIG. 8). The cut apart portions 126 and 128 move up onto rotating cleaning wheels 129 and 130 and the spiral treads of the cleaning wheels which move at a faster velocity than the gizzards 38 tend to pull the cut apart portions 126 and 128 further apart. The water nozzles 134 spray water up into the cut apart portions of the gizzards (FIG. 9). As the gizzards move off the upper portions of cleaning wheels 129 and 130, guide rods 140 and 141 which extends from the upper portions of the cleaning wheels tend to hold the cut apart portions of the gizzards apart while other water nozzles 134 direct cleaning water up into the cut apart gizzards (FIG. 10). The gizzards then pass off the ends of guide rods 140, 141, 143, 144 and 145 into peeling section 21 where the gizzards are urged down into engagement with the peeling rolls and the covering or "skin" of the gizzards is removed therefrom.

While this invention has been described in detail with particular reference to a preferred embodiment thereof, it will be understood that variations and modifications can be effected within the spirit and scope of the invention as described hereinbefore and as defined in the appended claims.

We claim:

1. A method of processing poultry gizzards comprising moving gizzards in sequence first along a horizontal path and then up an inclined path, wherein the step of moving the gizzards along the horizontal path includes the steps of placing the gizzards on a surface formed by a pair of elongated parallel side-by-side support surfaces defining a slot therebetween, with at least one of said support surfaces comprising a cylindrical drum with a spiral tread and with said other support surface comprising a rotatable rectilinear support bar including a portion thereof extending beyond the cylindrical drum with a spiral thread and rotating the cylindrical drum and the support bar about their longitudinal axes with the upper surfaces of the drum and support bar moving toward each other, moving the gizzards beyond the drum and supporting the gizzards on the rotatable support bar and on a stationary support bar extending parallel to the rotatable support bar, and engaging the gizzards from above the gizzards and urging the gizzards further along the rotatable support bar and the stationary support bar so that the entrails connected to the gizzards hang freely below the gizzards with the area of connection of the entrails to the gizzards located below the gizzards, and cutting the entrails away from the gizzards, cutting upwardly into the lower portions of the gizzards where the entrails were connected to the gizzards at the intersection of the horizontal path and the inclined path as the gizzards move from the horizontal path to the upwardly inclined path, and after the gizzards have moved from the horizontal path of the upwardly inclined path spreading the cut apart portions of the gizzards and removing loose matter from the inside the gizzards as the gizzards move along the upwardly inclined path.

2. A method of processing poultry gizzards comprising moving gizzards in sequence first along a horizontal path and then up an inclined path, and as the gizzards are moved along the horizontal path urging the entrails connected to the gizzards to hang freely below the gizzards with the area of connection of the entrails to the gizzards located below the gizzards, and cutting the entrails away from the gizzards, cutting upwardly into the lower portions of the gizzards where the entrails were connected to the gizzards at the intersection of the horizontal path and the inclined path as the gizzards move from the horizontal path to the upwardly inclined path, and after the gizzards have moved from the horizontal path to the upwardly inclined path moving the gizzards along a rail with the cut apart portions of the gizzards straddling the rail, and as the gizzards move along the rail moving the cut apart portions over a pair of cleaning wheels with spiral treads angled on the upper surfaces of the wheels rearwardly from the rail on each side of the rail, rotating the cleaning wheels with their upper surfaces moving in the direction of movement of the gizzards at a surface velocity faster than the velocity of the gizzards along the rail whereby the spiral treads of the cleaning wheels urge the cut apart portions of the gizzards away from each other.

3. In a method of processing poultry gizzards, the steps of moving split gizzards along a rectilinear rail with the cut apart portions of the gizzards straddling the rail, and as the gizzards move along the rail, moving the cut apart portions of the gizzards onto the upper surfaces of a pair of cleaning wheels which straddle the rail and which have spiral treads and with the treads on the upper surfaces of the cleaning wheels extending outwardly from and rearwardly along the rail, and rotating the cleaning wheels about axes extending at right angles with respect to the rail and with the upper peripherial surfaces of the cleaning wheels moving in the direction of movement of the gizzards so that the spiral treads of the cleaning wheels tend to spread the cut apart portions of the gizzards away from each other.

4. Apparatus for processing poultry gizzards comprising a rotary drum defining a cylindrical surface with a spiral tread imposed thereon, a rectilinear rotary support bar extending parallel to and in side-by-side relationship with said rotary drum and forming a slot with said rotary drum, drive means for turning the top surfaces of said rotary drum and said support bar toward said slot, whereby when poultry gizzards are placed on said drum and support bar the gizzards are moved along the drum and support bar and the entrails connected to the gizzards extend downwardly through the slot, said rotary support bar extending beyond an end of said rotary drum and including spiral threads thereabout, a stationary support bar extending from said rotary drum in side-by-side relationship with respect to said rotary support bar and forming a slot therebetween which is coextensive with the slot formed between said rotary drum and said rotary support bar, a conveyor chain including a lower flight movable above and parallel to the slot between said rotary support bar and said stationary support bar, whereby when poultry gizzards reach the end of said rotary drum they are moved along said rotary support bar and said stationary support bar by the conveyor chain and the rotary support bar, a first disc cutter extending over said stationary support bar and said rotary support bar for cutting beneath the gizzards moving along the support bars to remove the entrails from the gizzards, a second disc cutter extending upwardly through the slot between said support bars for cutting upwardly into the gizzards, and means for removing loose material from the gizzards.

5. The apparatus of claim 4 and wherein said stationary support bar includes a recess facing the slot between the support bars at a position beneath said first disc cutter.

6. The apparatus of claim 4 and wherein said stationary support bar includes a recess facing the slot between the support bars at a position adjacent said second disc cutter.

7. The apparatus of claim 4 and further including a support rail extending in alignment with said second disc cutter for receiving the cut poultry gizzards thereon, the lower flight of said conveyor chain extending over and parallel to said support rail, and wherein said means for removing loose material from the poultry gizzards comprises a pair of cleaning wheels straddling the support rail and means for rotating the cleaning wheels about axes perpendicular to the support rail with the upper surfaces of the cleaning wheels moving in the direction of movement with the lower flight of said chain conveyor.

8. Apparatus for processing poultry gizzards comprising a stationary rectilinear support bar, a rotatable support bar positioned in side-by-side parallel relationship with said stationary support bar and defining a slot therebetween, said rotatable support bar including spiral thread about its surface, and a chain conveyor including a lower flight exteding over and parallel to said support bars, whereby when poultry gizzards are placed on said support bars the rotation of said rotatable support bar and the movement of said chain conveyor cause the gizzards to move along said support bars.

9. The apparatus of claim 8 and further including a first rotary cutting disc extending in a lateral plane over said support bars for cutting entrails away from the gizzards, and a second rotary cutting disc extending upwardly through the slot between said support bars for cutting into the lower portions of the gizzards.

10. The apparatus of claim 9 and further including a support rail extending parallel to the plane of said second rotary cutting disc for receiving thereon gizzards cut by said second rotary cutting disc with the gizzards straddling the support rail, and a pair of cleaning wheels straddling said support rail and rotatable about axes extending perpendicular to said support rail, and means for rotating said cleaning wheels.

11. The apparatus of claim 10 and wherein said cleaning wheels each include spiral treads thereon, and wherein said means for rotating said cleaning wheels comprises means for rotating the upper surfaces of said cleaning wheels so that the portions of the spiral treads adjacent the support rail lead the portions away from the support rail.

12. Apparatus for processing poultry gizzards comprising a support rail, means for moving split gizzards along said support rail with the split apart portions of the gizzards straddling the upper portion of said support rail, a pair of cleaning wheels straddling said support rail with their upper surfaces adjacent the upper surface of said support rail and rotatable about axes perpendicular to said support rail, and means for rotating said cleaning wheels with a peripherial velocity greater than the velocity of the gizzards along said support rail, with the upper surfaces of said wheels moving in the direction of movement of the gizzards along the said support rail, each of said cleaning wheels including a spiral threaded peripherial surface with the portions of the threads of each wheel adjacent the rail leading the portions thereof away from the rail in the direction of rotation of each wheel, whereby the wheels tend to lift the split apart portions of the gizzards and the threads tend to spread the split apart portions away from each other.

13. In a method of processing poultry gizzards, the steps of supporting gizzards on the facing surfaces of a cylindrical drum with its longitudinal axis extending in a horizontal attitude and on a rectilinear support bar with its longitudinal axis extending parallel to the longitudinal axis of the drum, rotating the drum and the support bar in opposite directions of rotation and moving the gizzards along the lengths of the drum and support bar with spiral threads extending about the drum until the gizzards move off the end of the drum, after the gizzards move off the end of the drum supporting the gizzards on a stationary support bar extending parallel to the longitudinal axis of the drum and on the rotating support bar, moving the gizzards along the stationary support bar and the rotating support bar, and as the gizzards move along the stationary support bar and rotating support bar removing viscera from the gizzards and splitting the gizzards.

14. The method of claim 13 and wherein the step of moving the gizzards along the stationary support bar and the rotating support bar comprises engaging and moving the gizzards with spiral threads extending about the rotating support bar.

15. The method of claim 13 and wherein the step of moving the gizzards along the stationary support bar and the rotating support bar comprises engaging and moving the gizzards with the lower flight of a moving chain conveyor.

* * * * *